(12) United States Patent
Tsushima et al.

(10) Patent No.: US 6,970,614 B2
(45) Date of Patent: Nov. 29, 2005

(54) OPTICAL SWITCHING EQUIPMENT, OPTICAL TRANSPORT NETWORK, AND METHODS OF USING THEM

(75) Inventors: Hideaki Tsushima, Tokyo (JP); Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 10/082,135

(22) Filed: Feb. 26, 2002

(65) Prior Publication Data

US 2003/0118272 A1    Jun. 26, 2003

(30) Foreign Application Priority Data

Dec. 20, 2001 (JP) .............................. 2001-386926

(51) Int. Cl.[7] .............................. G02B 6/35; G02B 6/28
(52) U.S. Cl. ........................................ 385/16; 385/24
(58) Field of Search ................ 385/16–24; 398/41–43, 398/45, 49, 50, 58, 59

(56) References Cited

U.S. PATENT DOCUMENTS

| 6,697,546 B2 * | 2/2004 | Ibukuro et al. ............... 385/16 |
| 2002/0021857 A1 * | 2/2002 | Eng et al. ...................... 385/16 |
| 2004/0151499 A1 * | 8/2004 | Ibukuro et al. ............... 398/45 |

FOREIGN PATENT DOCUMENTS

| JP | 5-244098 | 9/1993 |
| JP | 11-289295 | 10/1999 |
| JP | 2001-339371 | 12/2001 |

* cited by examiner

Primary Examiner—Sarah Song
(74) Attorney, Agent, or Firm—McDermott Will & Emery LLP (57) ABSTRACT

The optical switching equipment is basically configured as a single configuration without protection as a basic unit and to split the optical signal into one signal passing through the equipment and the other signal to be added and dropped in the equipment and execute the adding and dropping process in a redundant portion. The optical transport network is configured to locate a plurality of optical switching equipments and optical transmission routes so as to allow the optical signals processed in the equipment for adding the optical signals to pass through the different optical transmission routes and equipments respectively. The optical signal allowed to pass through the equipment is processed in the single configuration portion of the equipment. The setting of the routes of the optical switching equipment and the optical transmission route makes it possible for the overall optical transport network to transmit the redundant optical signal.

12 Claims, 5 Drawing Sheets

| 4000 | | OADM (Add) | OADM (Pass) | OXC (Pass) | OXC (Pass) | OADM (Pass) | OADM (Drop) |
|---|---|---|---|---|---|---|---|
| ROUTE 0 (R0) | EQUIPMENT | 100-1 | 100-2 | 100-4 | 100-6 | 100-8 | 100-10 |
| | INPUT FIBRE / WAVELENGTH | 300-1(#1) / $\lambda_A$ | 200-1(#1) / $\lambda_1$ | 200-2(#1) / $\lambda_n$ | 200-6(#y) / $\lambda_n$ | 200-8(#x) / $\lambda_x$ | 200-9(#1) / $\lambda_n$ |
| | OUTPUT FIBRE / WAVELENGTH | 200-1(#1) / $\lambda_1$ | 200-2(#1) / $\lambda_n$ | 200-6(#y) / $\lambda_n$ | 200-8(#x) / $\lambda_x$ | 200-9(#1) / $\lambda_n$ | 300-6(#M) / $\lambda_A$ |
| ROUTE 1 (R1) | EQUIPMENT | 100-1 | 100-3 | 100-5 | 100-7 | 100-9 | 100-10 |
| | INPUT FIBRE / WAVELENGTH | 300-1(#N) / $\lambda_A$ | 200-3(#N) / $\lambda_1$ | 200-4(#x) / $\lambda_n$ | 200-7(#1) / $\lambda_n$ | 200-10(#x) / $\lambda_x$ | 200-11(#N) / $\lambda_n$ |
| | OUTPUT FIBRE / WAVELENGTH | 200-3(#N) / $\lambda_1$ | 200-4(#x) / $\lambda_n$ | 200-7(#1) / $\lambda_n$ | 200-10(#x) / $\lambda_x$ | 200-11(#N) / $\lambda_n$ | 300-6(#M) / $\lambda_A$ |

OPTICAL SWITCHING EQUIPMENT, OPTICAL TRANSPORT NETWORK, AND METHODS OF USING THEM

BACKGROUND OF THE INVENTION

The present invention relates to the configurations of optical transmission equipments and optical transport network and the methods of using them. More particularly, the invention relates to an optical switching equipment and an optical transport network which are suitable to processing a plurality of optical signals wavelength-multiplexed with one another and the methods of using them.

In order to achieve higher transmission speed and larger capacity, a study has been made of putting into practice optical switching equipment called an optical add drop multiplexer (referred to as an OADM) or an optical cross connect (referred to as an OXC), which equipment is arranged to not only transmit the wavelength-multiplexed optical signal but also switch the optical signal of a transmission route or path unit, and further of configuring an optical transport network provided with the OADM or the OXC. Herein, the transmission route or the path to be switched is often referred simply to as a route.

The foregoing optical transport network has been requested to have an economical network configuration having a highly reliable long haul transmission capability (such as a transmission without re-generators in the distance of 100 to 300 km). In order to make the network highly reliable, generally, the network has heretofore adopted a redundant configuration such as duplex of the OADM or OXC or duplex of an optical transmission route with protection route. Further, in order to realize the long haul transmission, for compensating a loss of optical signal level, commonly, there has been heretofore used a technique such as addition of an optical amplifier as disclosed in JP-A-5-244098.

The OADM or OXC to be used for configuring the optical transport network is arranged to have a properly selective combination of optical components such as an optical transmitter and receiver, an optical switch, an optical coupler, an optical distributor, an optical amplifier, and a transponder.

However, the existing optical switch brings about a loss of an optical signal in the range of several dB to several tens dB depending on the arrangement of the switch or the set route state. Further, though the optical transmitter and the optical receiver are commonly required to be placed before and after the optical switch, often, it is further requested to add the optical amplifier for adjusting the optical signal level, because the optical transmitter and receiver have a limitation in optical signal output power, receiver sensitivity and dynamic range. Moreover, the redundant configuration adopted for making the network highly reliable needs to have some components such as an optical distributor like an optical coupler and an optical selector like a 2×1 optical switch.

In order to achieve larger capacity on the future optical transport network for coping with the wavelength multiplexing, it is necessary to provide the foregoing optical components such as the optical coupler, the 2×1 optical switch, the transponder, and the optical amplifier for each of the wavelengths to be multiplexed. It means that the use of the redundant configuration like the simple duplex of the OADM or OXC results in making the apparatus larger in size and costly. Since the foregoing optical components (the optical switch, the optical coupler, the 2×1 optical switch, and so forth) bring about a loss of an optical signal in the range of several dB to several tens dB, the optical transport network provided with lots of these components connected in cascade brings about a larger optical signal loss inside the network accordingly. The larger optical loss requires the optical amplifier to be added on the way of the optical transmission route for the purpose of meeting the request of the long haul transmission, thereby making the optical transport network more costly.

In order to configure a highly reliable and economical wavelength-multiplexed optical transport network that is arranged to have a large capacity and make the long haul transmission possible, it is preferable to reduce the optical components in number by properly distributing the redundant configurations of the optical transport network or the equipments configuring the network, thereby reducing the optical signal loss of the network and making the network highly reliable and less costly. That is, it is requested to realize a highly reliable and economically-configured optical switching equipment which is approximate to the long haul transmission by suppressing the configuration redundancy and reducing the optical components in number, assemble these equipments for configuring the optical transport network, and provide the method of using the optical transmission equipment and the optical transport network that meet the foregoing request.

SUMMARY OF THE INVENTION

It is an object of the present invention to provide an optical switching equipment that meets the foregoing request.

It is a further object of the present invention to provide an optical transport network configured to have a combination of the optical switching equipments.

It is yet another object of the present invention to provide the method of using the optical switching equipment and the optical transport network for the purpose of realizing a highly reliable and economical wavelength-multiplexed optical transport network having a large capacity and a long haul transmission capability.

More particularly, it is an object of the present invention to provide the optical switching equipment that is configured to reduce the loss of the optical signal inside the optical transport network by suppressing the configuration redundancy inside of the equipment and thereby reducing the optical components in number and then to configure the optical transport network with a combination of these optical switching equipments. Further, it is also an object of the present invention to provide methods of setting the signal routes of the optical switching equipments and the optical transport network.

In carrying out the foregoing objects, according to an aspect of the invention, the optical switching equipment includes a single configuration without protection as a basic configuration and is configured to separate an optical signal to be inputted or outputted into one optical signal that merely passes through (transits) the equipment from the other optical signal that is to be added or dropped inside the equipment (or another equipment connected thereto) and to process the optical signal inside of the equipment in the redundant portion of the equipment.

More particularly, the optical signal that merely passes through (transits) the equipment is switched into another route in the single configuration without protection, while the optical signal to be added or dropped is duplexed. Then, these two optical signals are outputted to their corresponding optical transmission routes and optical switching equipments. Conversely, the two optical signals received from the respective optical transmission routes and optical switching equipments are processed in the duplex portion. Then, one optical signal is dropped.

According to another aspect of the invention, the optical transport network having a combination of the optical switching equipments is configured to locate a plurality of optical switching equipments so that the optical signals duplexed in the equipment pass through (transmit) different optical transmission routes and optical switching equipments and to connect these optical switching equipments through the optical transmission route. The optical signal that merely passes through (transmits) each equipment is processed in the single configuration without protection of the equipment for the purpose of reducing the optical components in number, thereby suppressing the loss of the optical signal and making the long haul transmission possible, while the overall optical transport network is configured to transmit (transit) the duplexed optical signal for keeping the optical transport network reliable.

Then, the methods of setting the routes of the optical switching equipments and the optical transport network are arranged so that (1) the optical switching equipment that adds the optical signal into the optical transport network operates to output the duplexed optical signals to the corresponding optical transmission routes and optical switching equipments, respectively, (2) the optical switching equipment in which the optical signal passes through (is relayed) sets the route so that the duplexed signals are allowed to pass through the respective optical transmission routes and optical switching equipments until the signals reach the optical switching equipment that drops one of the duplexed optical signals, and (3) the optical switching equipment that drops the optical signal from the optical transport network operates to collect the duplexed optical signals received from the corresponding optical transmission routes and optical switching equipments and to drop one of the signals.

In addition, the foregoing description has been expanded as taking a duplex case as an example of the redundant configuration. It goes without saying that the description holds true to the triplex or more as the redundant configuration.

Other objects, features and advantages of the invention will become apparent from the following description of the embodiments of the invention taken in conjunction with the accompanying drawings.

DESCRIPTION OF THE EMBODIMENTS

Hereafter, the arrangement of the optical switching equipment, the configuration of the optical transport network provided with the equipments, and the methods of using these equipments and the network according to the embodiments of the invention will be described in detail with reference to the appended drawings.

Figure 1:
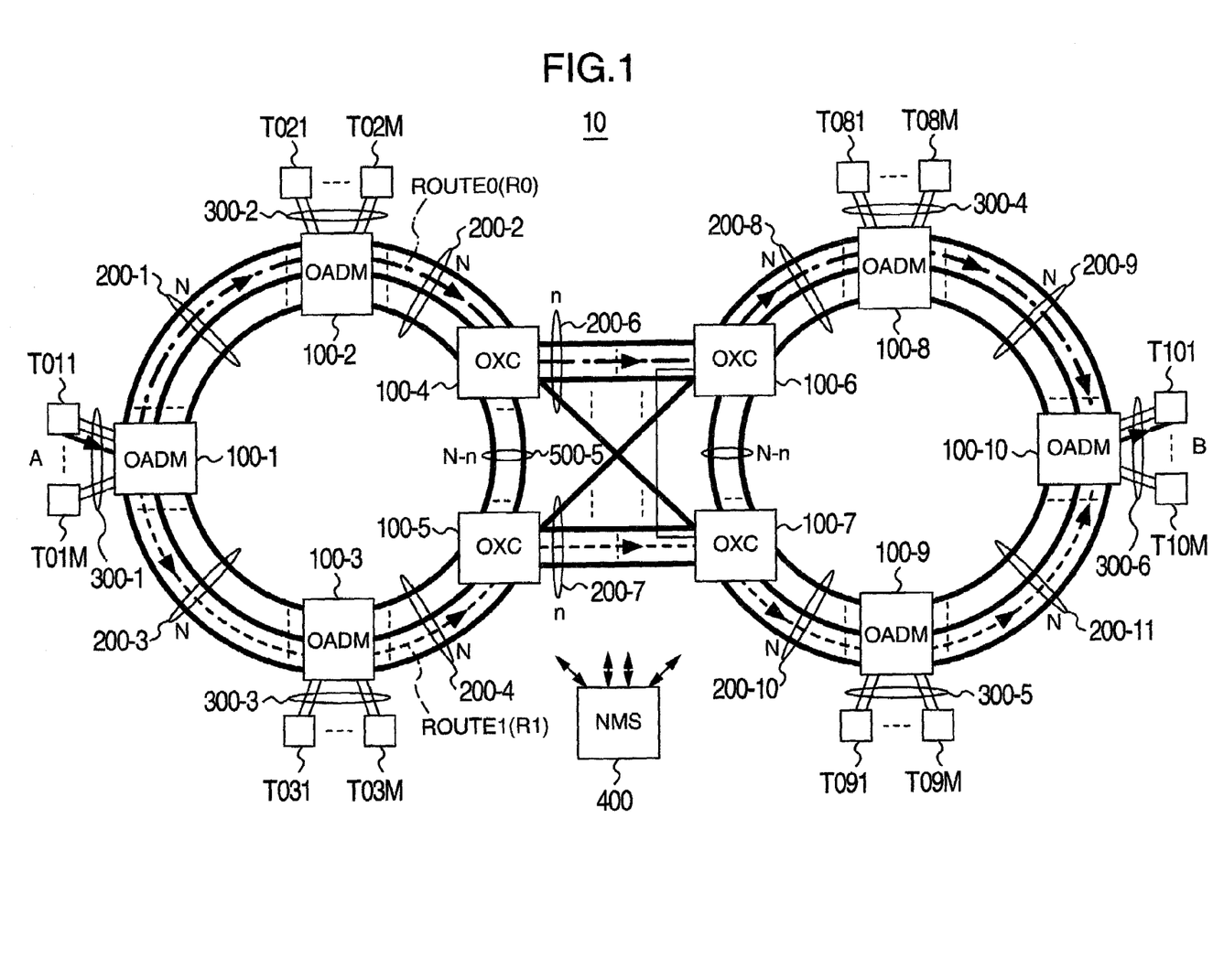
FIG. 1 is a network diagram illustrating a configuration of an optical transport network provided with optical switching equipments.

FIG. 1 is a network diagram for describing an exemplary configuration of the optical transport network provided with the optical switching equipments.

A numeral 10 denotes an optical transport network configured to have optical switching equipments 100 (100-1 to 100-10) and optical transmission equipments under the control of these optical switching equipments connected through optical fibres 200 (200-1 to 200-11) and 300 (300-1 to 300-6). Further, the optical transport network 10 is equipped with a network management system NMS 400 that operates to supervise and control the equipments 100 and the optical fibres 200 and 300.

More particularly, the optical transport network 10 includes an optical add drop multiplexer (OADM: 100-1 to 3, 100-8 to 10) and an optical cross connect equipment (OXC: 100-4 to 7). The OADM operates to transmit or receive a wavelength-multiplexed optical signal to or from each optical fibre 300, add or drop the optical signal required for a terminal T connected with the OADM of the multiplexed signal, and transmit or receive the optical signal to or from the optical fibre 300 under the control of the OADM itself. The OXC operates to switch the wavelength-multiplexed optical signal received from each optical fibre 300 at each received optical signal and then output the multiplexed signal to the destination optical fibre, that is, operates only to pass through (transmit) the optical signal. These OADMs and OXCs are connected through the optical fibres that transmit an optical signal at a proper multiplex level and transmission rate to the optical transport network, so that the network management system NMS 400 may set the routes of the optical signal of these equipments and the optical fibres.

This embodiment illustrates the configuration in which the optical transport network 10 provides the NMS 400 so that the NMS 400 may set the communication route in each optical switching equipment 100 and optical fibre 200. Instead, any one of the optical switching equipments 100 may be master system that operates to perform the settings of each equipment. As another alternative, the equipments 100 may define the communication routes by themselves through the use of a communication protocol such as GMPLS (Generalized Multiprotocol Label Switching) being studied in the Organization for Standardization like the IEFT (Internet Engineering Task Force).

The optical switching equipment and the method of using the optical transport network configured to use the equipment according to the invention will be described with the communication from the terminal A (T011) to the terminal B (T101) as an example.

(1) The OADM 100-1 receives the optical signal (single) to be added to the optical transport network 10 from the terminal A (T011) on the optical fibre 300-1, when the OADM 100-1 operates to duplex the received optical signal into two optical signals. The OADM-1 operates to control the components such as an optical switch located inside the equipment and set the routes of two optical signals so that the duplexed optical signals may be outputted to the corresponding optical fibres 200 and optical switching equipments 100 and then to output the two optical signals from the terminal A (T011) into the corresponding routes (route 0 (R0) and route 1 (R1)).

(2) Each of the OADMs (100-2, 3, 8, 9) and the OXCs (100-4 to 7) located midway is just required to transmit the received optical signal toward the OADM 100-10. Hence, the equipment operates to control the components such as an optical switch inside itself, set one route corresponding to the optical signal passing therethrough, and then output the optical signal from the terminal A (T011) to the OADM 100-10. Concretely, each equipment 100 located on R0 or R1 operates to control the single configuration optical component and then set the route for R0 or R1.

(3) The OADM 100-10, which has a role of dropping the optical signal from the optical transport network 10 to the terminal B (T101), receives the two versions (duplexed) of the optical signal from the terminal A (T011) from the corresponding routes R0 and R1. Hence, the OADM 100-10 operates to control the components such as the optical switch inside the equipment and set two routes so as to select one of the duplexed optical signals and then output it to the terminal B (T101). The OADM 100-10 operates to execute the termination process such as the error detection of each optical signal and the compensation of optical power level in the duplexed portion inside the equipment, select one of the optical signals, and then output it to the terminal B (T101) through the optical fibre 300-6.

The optical switching equipment and the optical transport network configured to use it according to the invention are configured and operated as described above. Hence, the redundant portion of the optical components for keeping the reliability of the optical switching equipment is required to be defined as only a portion of adding and dropping the optical signal into the optical transport network, while the other portion may take a single configuration without protection, which equipments 100 may be a master system that operates to perform the settings of each equipment. Of results in reducing the optical components in number and thereby realizing the economical equipment. Moreover, it results in reducing the optical signal loss, thereby making the long haul transmission possible. Further, it also results in reducing the number of adds of the optical components like an optical amplifier on the optical signal route, thereby implementing the optical transport network with an economical configuration. The optical signal to be communicated between the terminals is made redundant in the optical transport network when it is transmitted. Hence, most of the optical switching equipment may take the single configuration without protection without having to lower the reliability.

Figure 2:
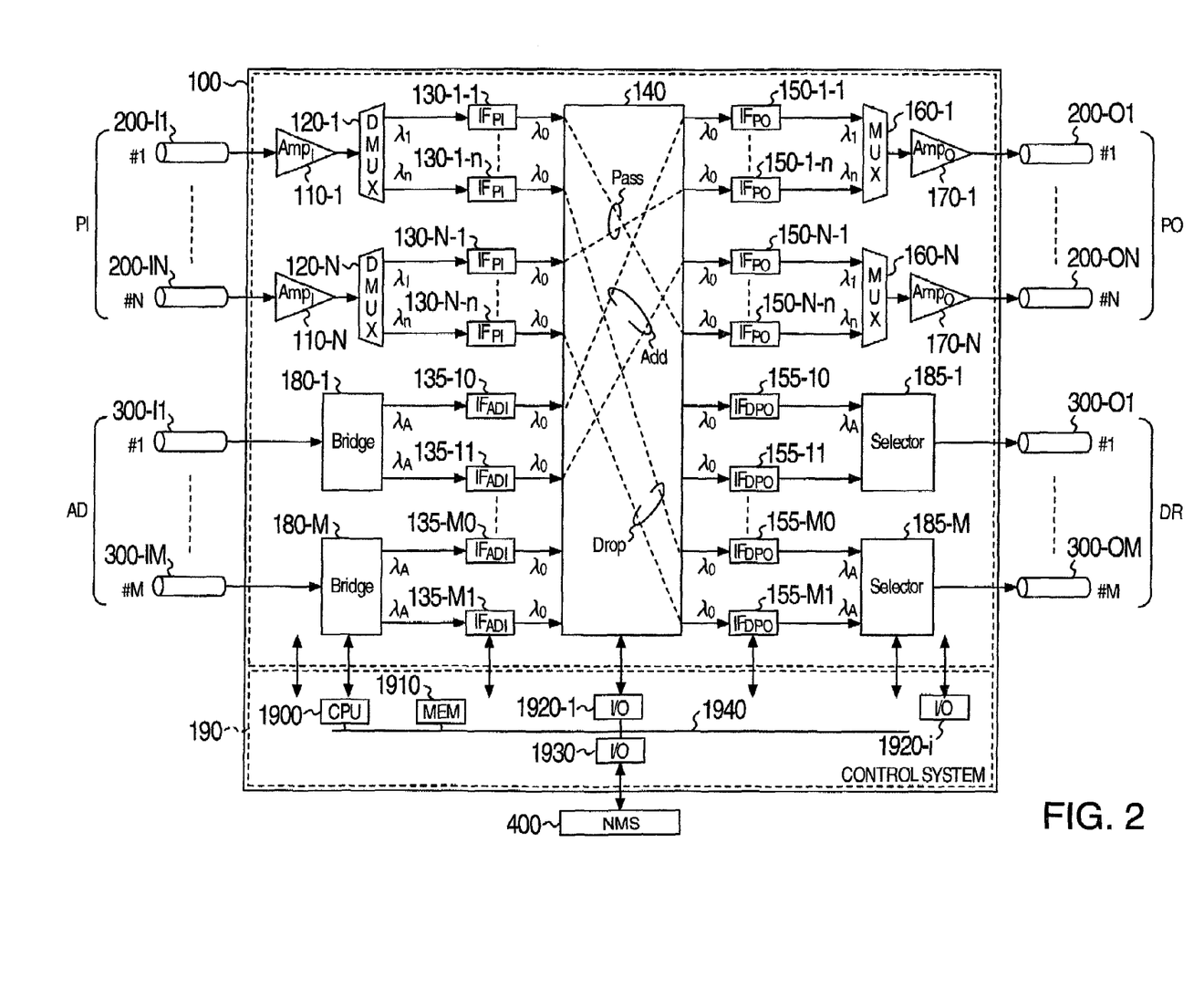
FIG. 2 is a block diagram showing a configuration of an optical switching equipment.

FIG. 2 is a block diagram illustrating an exemplary configuration of the optical switching equipment.

The optical switching equipment 100 realizes the OADM. The equipment 100 accommodates N optical fibres (200-I1 to IN, 200-O 1 to ON) as inputs and outputs and transmits and receives a plurality of wavelength-multiplexed optical signals (for example, n wavelengths) through the corresponding optical fibres 200. Further, the equipment 100 accommodates M optical fibres (300-I1 to IM, 300-O1 to OM) as inputs and outputs, and transmits and receives the optical signals to and from the terminal T connected with the equipment itself. The optical switching equipment 100 provides an optical switch SW 140 and operates to set a route of the optical signal and output the optical signal from the terminal T to the optical fibres (200-O1 to ON) for adding it to the optical transport network 10, output the optical signal from the optical fibres (200-I1 to IN) to the terminal T for dropping the optical signal from the optical transport network 10, or pass(transmit) the optical signals from the optical fibres (200-O1 to ON) through any one of the optical fibres (200-I1 to IN). The broken line indicated inside the switch 140 shown in FIG. 2 indicates a setting example (Pass, Add, Drop) of a route of the optical signal.

Concretely, the optical signal (n wavelength-multiplexed) received from the optical fibre PI (200-I1 to IN) through an optical amplifier $Amp_I$ (110-1 to N) is demultiplexed into each wavelength signal ($\lambda_1$ to $\lambda_n$). Each of the optical signals (n) of each wavelength is subject to the treatments such as wavelength assignment and re-generation of signal in the transponder or the re-generator $IF_{PI}$ (130-1-1 to 130-N-n) so that the treatment of each optical signal is made easier inside the equipment, and then the optical signal is supplied into the SW 140. In addition, the wavelength $\lambda_o$ is irrespective of the wavelengths $\lambda_1$ to $\lambda_n$ and may take any one within a predetermined wavelength band. For example, it may be realized in the 1.3 μm, the 1.5 μm, and 0.85 μm band, for example. It may use the same wavelength band as the wavelength $\lambda_o$.

Further, the optical signal from the terminal T connected with the equipment through the optical fibre AD (300-I1 to IM) is duplexed into two optical signals through the use of the optical distributor Bridge (180-1 to M). The optical signal is wavelength-converted or regenerated and then is supplied to the SW 140. In addition, the wavelength $\lambda_A$ is irrespective of the wavelengths $\lambda_1$ to $\lambda_n$ and may take any one within a predetermined wavelength band. For example, it may be realized in the 1.3 μm, the 1.5 μm, and 0.85 μm band, for example. It may use the same wavelength band as the wavelength $\lambda_o$.

The SW 140 has a role of setting the route of the optical signal as indicated by the broken lines inside the SW 140 shown in FIG. 2 in response to the indication given by the control system 190. The SW 140 operates to set the route of the optical signal received from the optical fibres PI and the optical signal received from the optical fibres AD which are duplexed by bridge (180) thereafter so that the received optical signals may be outputted to any one of the optical fibre PO (200-O1 to ON) or DR (300-O1 to OM). In addition, this SW 140 may be a combination of practical matrix switches. The arrangement of the switch does not restrict the present invention.

The optical signal passed through the SW 140 is wavelength-assigned or regenerated in the transponder or the regenerator $IF_{PO}$ (150-1-1 to 150-N-n) or $IF_{ADO}$ (155-10 to M1). The optical signal to be outputted to another optical switching equipment and passed through any one of the optical fibres PO (200-O1 to ON) is n wavelength-multiplexed in the optical multiplexer MUX (160-1 to N) and then is outputted through the optical amplifier $Amp_O$. The optical signal to be outputted to the terminal T and passed through any one of the optical fibres DR (300-O1 to OM) is duplexed and comes from two routes through two optical fibres PI and the SW 140. Hence, the optical selector (185-1 to M) operates to selectively output any one of the optical signals. The selecting condition is predetermined by the factor that brings about a less degrade in performance, such as the optical power or the bit error rate of the received optical signal. The control system 190 to be discussed below is arranged to control the selector 185 or the selector 185 operates to select the condition by itself.

The control system 190 has a role of supervising and controlling the setting of a route of the optical switching equipment 100. The control system 190 includes a memory MEM (1910) for storing an operating program for supervision and control and information required for setting the route, an interface I/O (1920) for transferring the supervision and control information with each of the optical components (SW 140), and a processor CPU (1900) for executing the supervision and control of the overall equipment 100 based on the content of the MEM 1910, all of which are connected through a bus 1940. Further, the control system 190 provides the interface I/O (1930) for transferring the supervision and control information with the NMS 400, the interface I/O being connected with the bus 1940. In order to set the route of the optical signal as indicated in FIG. 1 to the optical transport network 10, the NMS 400 notifies each optical switching equipment 100 of the information required for setting the SW 140 through the I/O 1930. Then, the control system 190 of each equipment 100 operates to store the information in the MEM 1910 and the CPU 1900 operates to control the SW 140 through the I/O 1920 and set the route of the optical signal as indicated by a broken lines of the SW 140 shown in FIG. 2.

As described above, in place of locating the NMS 400, any one of the equipments 100 located in the optical transport network 10 is served as a master equipment, which operates to set the route of other equipments 100 or determine the route of each equipment through the use of the communication protocol defined by the equipments 100 themselves. The configuration of the control system 190 is substantially same as the foregoing configuration. In place of locating the I/O 1930, the supervision and control information may be transmitted or received through the optical fibre 200. In this case, the control system 190 operates to transmit and receive the outputs of the IF 130 and 150 and the output of the SW 140 as the monitor control information through the I/O 1920.

In addition, the transponder or the regenerator (130, 135, 150, 155) used in the equipment 100 may have the same equipments. Further, the description has been expanded with the OADM as an example. In place, the OXC may be easily arranged so that the Bridge 180 shown in FIG. 2 is replaced with Amp$_I$ 110 and DMUX 120 and the Selector 185 is replaced with the MUX 160 and the Amp$_O$ 170. Or, the OXC may be easily arranged by removing the Bridge 180, the Selector 185, the IF$_{ADI}$, and the IF$_{ADO}$ 155. The Bridge 180 may be realized by using the optical coupler, the 1×2 optical switch and the 2×2 optical switch. Likewise, the Selector 185 may be realized by using the 1×2 optical switch and the 2×2 optical switch.

In the optical switching equipment according to the invention, the redundancy of the optical components in the equipment is only one portion of adding or dropping the optical signal into the optical transport network and the other portion may have a single configuration without protection. This arrangement results in reducing the number of the optical components and thereby realizing the economical equipment. Further, this arrangement also results in reducing the loss of the optical signal and making the long haul transmission possible, thereby improving the reliability of the equipment itself. In addition, even if the almost portion of the optical switching equipment may have a single configuration without protection, the optical signal to be communicated between the terminals is made redundant inside the optical transport network, so that the reliability of the optical transport network may be maintained.

Figure 3:
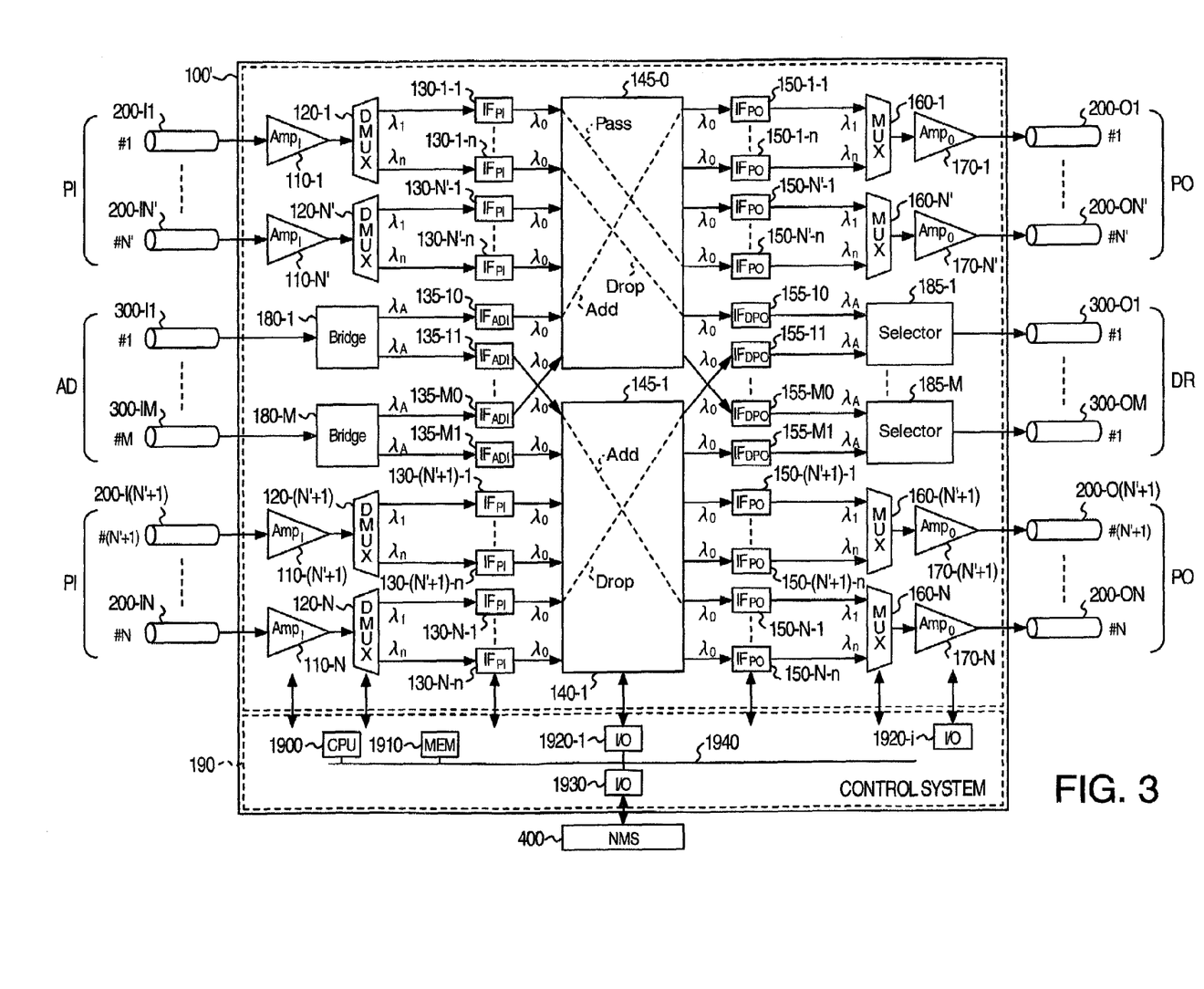
FIG. 3 is a block diagram showing another configuration of an optical switching equipment.

FIG. 3 is a block diagram showing another arrangement of the optical switching equipment. The optical switching equipment 100' accommodates N optical fibres (200-I1 to IN, 200-O1 to ON) and M optical fibres (300-I1 to IM, 300-O1 to OM) as inputs and outputs and configures the OADM like the equipment 100 shown in FIG. 2. The different respect of the optical switching equipment 100' from the equipment 100 shown in FIG. 2 is the arrangement of the SW and the route setting inside the equipment. Hereafter, the different respect will be discussed in detail.

The optical switching equipment 100' uses a plurality of SWs 145-0 and 145-1 (2 SWs in this embodiment) in place of the SW 140.

The optical signal received through the optical fibres PI (200-I1 to IN) and passed through the equipment 100' is outputted from the optical fibre PO (200-O1 to ON) by setting the route to the SW 145-0 or 145-1 as indicated by a broken line inside the SW 145 shown in FIG. 3.

As to the optical signal received through the optical fibres PI (200-I1 to IN) and dropped from the equipment 100', two optical signals are received from two optical fibres PI so that each of the duplexed optical signals may be selected by the Selector 185 through the SW 145-0 or 145-1. More particularly, the optical transport network 10 or the optical switching equipment 100 or 100' located at the previous stage may be set so that the duplexed optical signals may enter into the SW 145-0 and 145-1, respectively. Then, as indicated by a broken line inside the SW 145 shown in FIG. 3, the routes to the SW 145-0 and 145-1 are set so that any one of the terminated optical signals is selected by the Selector 185 and then is outputted through the optical fibre DR (300-O1 to OM).

As to the optical signal received through the optical fibre AD (300-I1 to IM) and then added from the equipment 100' into the optical transport network 10, the duplexed optical signals are outputted from the two optical fibres PO through the SW 145-0 and 145-1, respectively. Concretely, as indicated by a broken line inside the SW 145 shown in FIG. 3, the routes to both the SW 145-0 and 145-1 are set so that the duplexed optical signals may be outputted from the different two optical fibres PO (200-01 to ON).

The arrangements of the control system 190 and the other optical components are the same as those of the optical switching equipment 100 shown in FIG. 2. The OXC may be also easily realized by the similar technique to that described with reference to FIG. 2.

In the foregoing description, the duplexed optical signals to be added or dropped have been routed into the SWs 145-0 and 145-1, respectively. In place, these optical signals may be routed to one of these switches. In this case, the optical switching equipment 100' has the substantially same arrangement and using method as the optical switching equipment 100 shown in FIG. 2.

In the optical switching equipment arranged as shown in FIG. 3, the switches SW are located in a distributive manner. Hence, if one SW is failed, one of the optical signals to be added or dropped is alive and part of (if simply arranged, a half of) the optical signal passing therethrough is saved, so that the reliability is further improved.

The foregoing optical switching equipment 100 or 100' according to the invention is served to easily configure so flexible an optical transport network as to cope with various transmission rate and multiplex levels if the optical components are properly selected. For example, no restriction is laid down on the number of wavelengths to be multiplexed if the optical signal is transmitted at a rate of STM-O (51.84 MHz) or a faster rate, STM-O being defined by the recommendation of the ITU-T (International Telecommunications Union, Telecommunication Standardization Sector).

Figure 4:
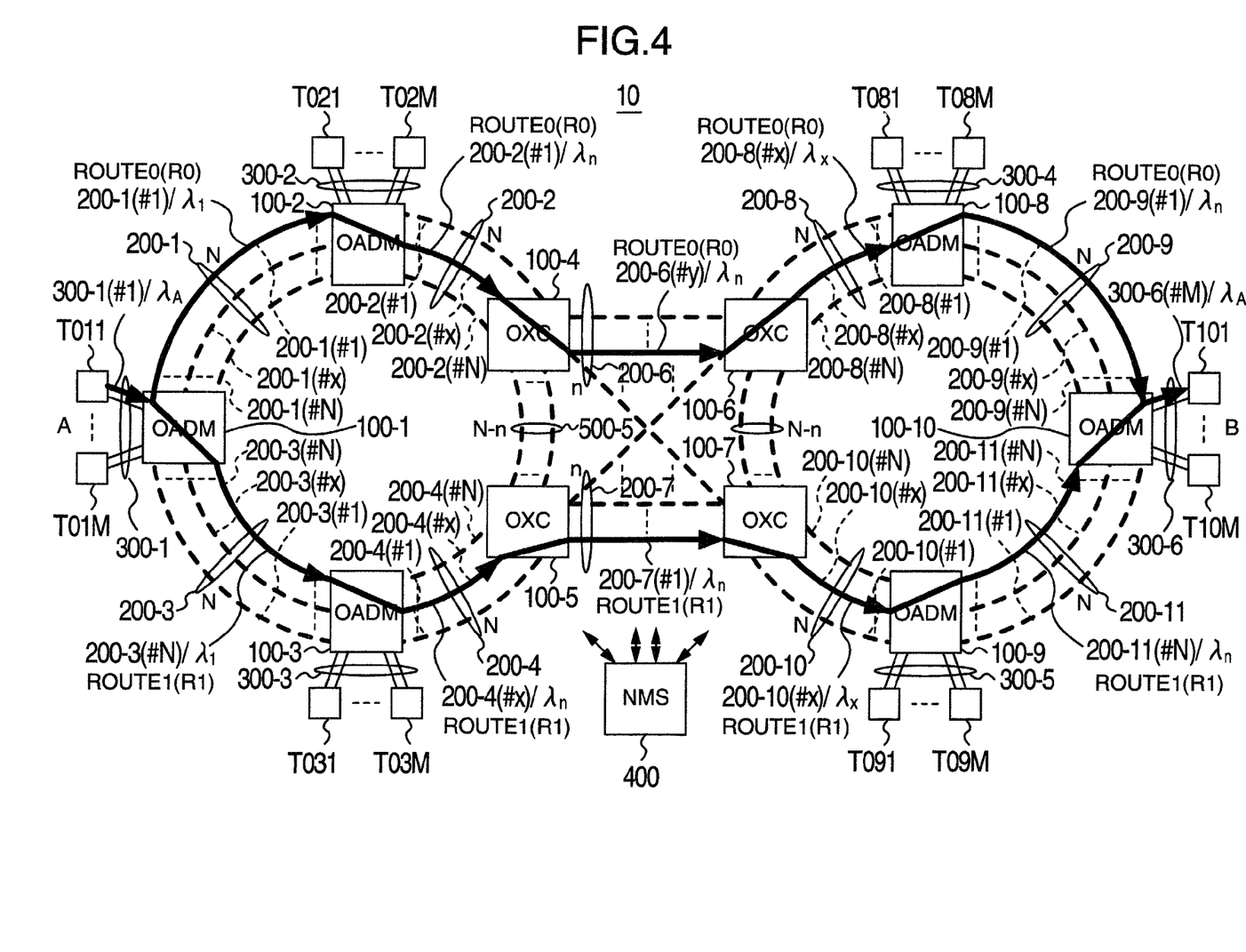
FIG. 4 is an explanatory view (1) for explaining the method of using the optical switching equipments and the optical transport network.
Figure 5:
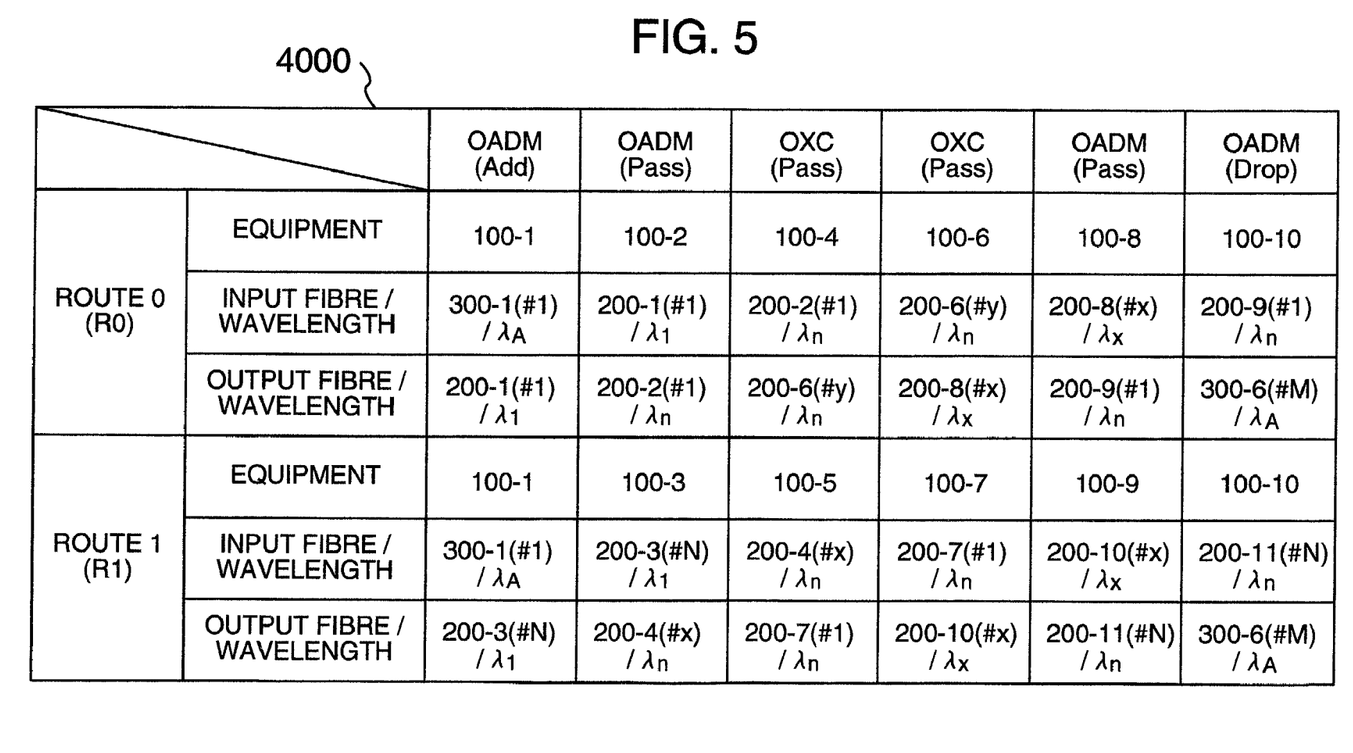
FIG. 5 is an explanatory view (2) for explaining the method of using the optical switching equipments and the optical transport network.

FIGS. 4 and 5 are explanatory views for explaining the method of using the optical switching equipment and the optical transport network provided with the optical switching equipments according to the present invention.

Later, the description will be oriented to the optical switching equipment 100 or 100', the operation of routing the optical transport network 10 provided with the optical switching equipments, and the methods of using the equipment and the optical transport network as taking as an example transmission of a signal from the terminal A (T011) connected with the OADM 100-1 to the terminal B (T101) connected with the OADM 100-10.

The NMS 400 collects the status information of each equipment 100-1 to 10, such as an idle or busy status of the SW 140 or 145 or each wavelength, a failure of each optical component, a status of an optical signal (the optical power level, the bit-error rate, and so forth). Further, the NMS 400 also collects the status information of the optical fibre 200.

The NMS 400 operates to store in the storage device (not shown) inside itself the collected status information of the equipment 100 (100') and the optical fibre. If it is requested to communicate data from the terminal A (T011) connected with the OADM 100-1 to the terminal B (T101) connected with the OADM 100-10, the NMS 400 operates to retrieve the idle (usable) optical component like SW 140 or 145, the idle wavelength and the idle fibre from the status information of each equipment 100 and the optical fibre 200 that both enable to supply a route between the terminals, and then to determine the route inside the transport network 10. When two routes R0 and R1 are determined as indicated in the route determined result 4000 shown in FIG. 5, the NMS 400 operates to transmit the control information to the optical switching equipments 100-1 to 10 located on the route for setting the route.

The foregoing collection and storage of information, determination of routes, and transmission of control information to each equipment may be executed by a predetermined algorithm under the control of a processor (not shown) provided in the NMS 400 or may be manually executed by an administrator of the optical transport network 10 with the NMS 400.

When the control system 190 sets the following routes inside each of the optical switching equipments 100-1 to 10 based on the received information, each of the optical switching equipments 100-1 to 10 is routed between the terminals as shown in FIG. 4 or 5 so that the equipment be communicable.

(1) The OADM 100-1 operates to control the optical switch 140 (145) in response to an indication given by the NMS 400 so that the received optical signal is duplexed into two optical signals and each of the optical signals is outputted to the corresponding OADM 100-2 or 100-3 through the corresponding optical fibre 200-1 (#1) and 200-3 (#N) and set the routes R0 and R1 for the two optical signals. This setting makes it possible to configure the SW 140 (145) of the OADM 100-1 and the optical components located at a later stage of the SW 140 (145) as a single configuration without protection. This results in reducing the optical components in number, thereby realizing an economical long haul transmission with a small optical signal loss. Since the OADM 100-1 duplexes the optical signal before adding it to the optical transport network 10, even if the almost of the equipment provided in the optical transport network 10 is configured as a single configuration without protection, one route is failed but the other route is active. Hence, the reliability can be maintained.

(2) Each of the OADM (100-2, 3, 8, 9) and the OXC (100-4 to 7) on the route operates to control the optical switch 140 (145) in response to an indication given by the NMS 400 and set the route RO or R1 of one optical signal toward the OADM 100-10 as indicated in the determined result 4000 shown in FIG. 5. This setting makes it possible to configure each equipment $Amp_I$110 to SW 140 (145) to $Amp_o$170 as a single configuration without protection. This results in realizing an economical long haul transmission with a small number of optical components and a small 1 optical signal loss. Even the single configuration of the equipment allows the reliability to be maintained because two routes are set on the optical transport network 10.

(3) The OADM 100-10 receives the optical signals from the routes R0 and R1 through the optical fibres 200-9 (#1) and 200-11 (#N), respectively. Hence, the OADM 100-10 operates to control the optical switch 140 (145) in response to an indication given by the NMS 400 so that the selector 185 selects one of the optical signals and outputs it to the terminal B (T101) and thereby set the routes R0 and R1 for the two optical signals. This setting makes it possible to process the optical signals duplexed inside the optical transport network 10, thereby keeping the reliability. In addition, only the $IF_{DRO}$ of the equipment 100 (100') has a duplex configuration, which results in reducing the optical components in number, thereby realizing an economical equipment.

The foregoing setting of the routes makes it possible to use the optical switching equipment with a small optical signal loss and a small number of components as a result of arranging as a redundant portion one or a few optical components for adding and dropping the optical signal to the optical transport network. This results in implementing the optical transport network with an economical long haul transmission capability. Moreover, since the optical signal to be communicated between the terminals is made redundant inside the optical transport network when it is transmitted, even if the almost of the optical switching equipment is configured in as a single configuration without protection, the reliability can be maintained.

The present invention implements the optical switching equipment with a small number of optical components and a small optical power loss because the redundancy of the equipment is reduced. Then, in the optical transport network having a combination of these equipments, the method of setting a route of the optical signal is provided so that the reliability of the overall optical transport network can be maintained by selectively using the redundant portion and the single configuration portion. This results in implementing the highly reliable optical transport network with an economical long haul transmission capability.

It should be further understood by those skilled in the art that the foregoing description has been made on embodiments of the invention and that various changes and modifications may be made in the invention without departing from the spirit of the invention and scope of the appended claims.

What is claimed is:

1. An optical switching equipment for switching a route of an optical signal received from any one of a plurality of optical transmission routes and outputting said optical signal to any one of a plurality of optical transmission routes, comprising:

first interfaces for transmitting or receiving optical signals to or from other optical switching equipment through a plurality of first optical transmission routes;

second interfaces for transmitting or receiving optical signals to or from a communicating equipment connected to said optical switching equipment through a plurality of second optical transmission routes;

at least one optical switch for providing routes of optical signals between interfaces; and a control circuit for setting the route of each the optical signals inside said at least one optical switch; wherein:

each of said second interfaces includes means for splitting a signal received from a second optical transmission route into a plurality of optical signals for output to said optical switch, and means for selecting one of a plurality of optical signals received from said optical switch for output as a selected signal to a second optical transmission route, said control circuit sets a route between first interfaces in said at least one optical switch, and said control circuit sets in said at least one optical switch at least one of:
  (a) routes outputting the plurality of optical signals split at one of said second interfaces to different first optical transmission routes, and
  (b) routes leading optical signals from different first optical transmission routes, having been split from an optical signal at a second interface of another optical switching equipment, to one of said selecting and outputting means in a second interface in said optical switching equipment.

2. An optical switching equipment as claimed in claim 1, wherein when an output destination of an optical signal received from any one of said plurality of first transmission routes corresponds to any one of said plurality of first optical transmission routes, the control sets a route through the at least one optical switch to the first interface corresponding to the destination first optical transmission route and the received optical signal is outputted thereto.

3. An optical switching equipment as claimed in claim 1, wherein said at least one optical switch comprises a plurality of optical switches and the optical signal received from a respective second optical transmission route and the optical signal to be outputted to said respective second optical transmission route are routed to different optical switches so as to output the split optical signals to the first different optical transmission routes and receive optical signals from the first different optical transmission routes.

4. An optical switching equipment as claimed in claim 3, wherein when the output destination of the optical signal received from any one of said plurality of first transmission routes corresponds to any one of said plurality of first optical transmission routes, the route corresponding to the first optical transmission route where said optical signal is to be outputted is set to any one of said optical switches and said optical signal is outputted thereto.

5. An optical switching equipment for switching a route of an optical signal received from any one of a plurality of optical transmission routes and outputting said signal to any one of a plurality of optical transmission routes, comprising:
  a plurality of optical receivers for receiving optical signals from a plurality of first optical transmission routes;
  a plurality of optical distributors for receiving optical signals from a plurality of second optical transmission routes and distributing received signals as a plurality of optical signals;
  at least one optical switch provided with a plurality of input and output terminals respectively and for switchably outputting any of the optical signals received from said optical receivers and said optical distributors at any one of said plurality of input terminals to any one of said plurality of output terminals;
  a plurality of optical transmitters for outputting the optical signals from first output terminals of said at least one optical switch to the first optical transmission routes corresponding to said first output terminals;
  a plurality of optical selectors, each for receiving a plurality of optical signals from second output terminals of said at least one optical switch, selecting any one of the optical signals from the second output terminals, and outputting said selected signal to the second optical transmission route corresponding to said second output terminals; and
  a control circuit for setting each route of an optical signal in said optical switch; wherein:

said control circuit sets a route in the at least one optical switch leading an optical signal from one said optical receivers to one of said optical transmitters, and said control circuit sets in said optical switch at least one of:
  (a) routes outputting the plurality of optical signals split at one of said optical distributors to different optical transmitters; and
  (b) routes leading optical signals transmitted on different first optical transmission routes, having been split from an optical signal at an optical distributor of another optical switching equipment, to one of said optical selectors in said optical switching equipment.

6. An optical switching equipment as claimed in claim 5, wherein when an output destination of an optical signal received from any one of said plurality of first transmission routes corresponds to any one of said plurality of first optical transmission routes, the control sets a route through the at least one optical switch to the optical transmitter corresponding to the destination first optical transmission route and the received optical signal is outputted thereto.

7. An optical switching equipment as claimed in claim 5, wherein said at least one optical switch comprises a plurality of optical switches, and the optical signal received from a respective second optical transmission route and the optical signal to be outputted to said second optical transmission route are routed to the different optical switches so as to output the split optical signals to the first different optical transmission routes and receive optical signals from the first different optical transmission routes.

8. An optical switching equipment as claimed in claim 7, wherein when the output destination of the optical signal received from any one of said plurality of first transmission routes corresponds to any one of said plurality of first optical transmission routes, the route corresponding to the first optical transmission route where said optical signal is to be outputted is set to any one of said optical switches and said optical signal is outputted thereto.

9. A method of using an optical switching equipment for switching a route of an optical signal received from any one of a plurality of first optical transmission routes and second optical transmission routes and outputting the optical signal to any one of a plurality of third optical transmission routes, and a plurality of fourth optical transmission routes, comprising the steps of:
  switching the routes of the two optical signals respectively received from different first optical transmission routes;
  selecting one of said at least two optical signals for which routes have been switched for said one of said fourth optical transmission routes;
  outputting the selected one optical signal to said one of said fourth optical transmission routes;
  splitting an optical signal received from any one of said second optical transmission routes into at least two optical signals;
  switching the routes of the at least two split optical signals for different third optical transmission routes, respectively; and
  outputting the at least two split optical signals for which routes have been switched to said different third optical transmission routes.

10. The method of claim 9, further comprising:
    switching the route of at least one optical signal received from one of the different first optical transmission routes for one of said different third optical transmission routes; and
    outputting the at least one optical signal for which the route have been switched to said one of the different third optical transmission routes together with one of the split optical signals.

11. An optical transport network comprising a plurality of optical switching equipments connected with a plurality of first optical transmission routes and for transmitting or receiving optical signals between said optical switching equipments, each of said optical switching equipments comprising:
    first interfaces for transmitting or receiving optical signals to or from another optical switching equipment through a plurality of first optical transmission routes,
    second interfaces for transmitting or receiving optical signals to or from a communicating equipment connected with said optical switching equipment through a plurality of second optical transmission routes,
    at least one optical switch for providing routes of said optical signals between interfaces; and
    a control circuit for setting the routes of the optical signals inside said at least one optical switch; wherein:
    in the case of adding an optical signal received from a second optical transmission route into said optical transport network, said received optical signal is split into a plurality of optical signals at one of said second interfaces, and the respective split optical signals are transmitted to different optical switching equipments via the different routes in said at least one optical switch and different first optical transmission routes respectively connected to the different switch routes,
    in the case of dropping an optical signal received from said optical transport network to a second optical transmission route, different routes in said optical switch are set for a plurality of optical signals received from different optical switching equipments via different first optical transmission routes to one of said second interfaces, and said one of said second interfaces selects one optical signal to output, and
    in the case of relaying an optical signal inside said optical transport network, and optical signal received from one of said plurality of first transmission routes is output to a destination first optical received from one of said plurality of first transmission routes is output to a destination first optical transmission route through a route set in said optical switch.

12. An optical switching equipment for switching the route of an optical signal received from any one of a plurality of optical transmission routes and then outputting said optical signal to any one of a plurality of optical transmission routes, comparing:
    a plurality of optical receivers for receiving wavelength-multiplexed optical signals from a plurality of first optical transmission routes;
    a plurality of optical demultiplexors for demultiplexing said wavelength-multiplexed optical signals into respective frequency signals;
    a plurality of first optical signals adjusters for converting the frequency of and adjusting the level of optical signals outputted from said optical demultiplexers;
    a plurality of optical distributors for receiving optical signals from a plurality of second optical transmission routes and distributing each optical signal received from a second optical transmission route as a plurality of optical signals;
    at least one optical switch provided with a plurality of input and output terminals respectively and for switching any one of the optical signals from optical signal adjusters and from said optical distributors received at any of said input terminals to any one of said terminals;
    a plurality of second optical signal adjusters for converting the frequency and adjusting the level of the optical signals outputted from said at least one optical switch;
    a plurality of optical multiplexers for multiplexing the outputs of a plurality of the second optical signal adjusters into wavelength-multiplexed optical signals;
    a plurality of optical transmitters for outputting the wavelength-multiplexed optical signals from said optical multiplexers to the first optical transmission routes;
    a plurality of optical selectors, each for receiving a plurality of optical signals from the outputs of a plurality of second optical signal adjusters, selecting an optical signal, and outputting said selected optical signal to a respective second optical transmission route; and
    a control circuit for setting the routes of the optical signals in said at least one optical signal; wherein:
    said control circuit sets a route leading the optical signal from one of said first optical signal adjusters to one of said second optical signal adjusters in said at least one optical switch, and
    said control circuit sets in said at least one optical switch at least one of:
    (a) routes outputting the plurality of optical signals split at one of said optical distributors to second optical signal adjusters connected with different optical multiplexers; and
    (b) routes leading the optical signals from different first optical transmission routes, the optical signals having been split from an optical signal at an optical distributor of another optical switching equipment, to one of said optical selectors in said optical switching equipment.

* * * * *